US012674808B2

(12) United States Patent
Ahmed

(10) Patent No.: US 12,674,808 B2
(45) Date of Patent: Jul. 7, 2026

(54) DIAGNOSTIC ANALYZERS AND QUALITY CONTROL METHODS

(71) Applicant: Siemens Healthcare Diagnostics Inc., Tarrytown, NY (US)

(72) Inventor: Muhammad Ahmed, Yonkers, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 286 days.

(21) Appl. No.: 17/757,379

(22) PCT Filed: Dec. 11, 2020

(86) PCT No.: PCT/US2020/064643
§ 371 (c)(1),
(2) Date: Jun. 15, 2022

(87) PCT Pub. No.: WO2021/126710
PCT Pub. Date: Jun. 24, 2021

(65) Prior Publication Data
US 2023/0009309 A1     Jan. 12, 2023

Related U.S. Application Data

(60) Provisional application No. 62/948,754, filed on Dec. 16, 2019.

(51) Int. Cl.
*G01N 35/00* (2006.01)
*G01N 35/10* (2006.01)

(52) U.S. Cl.
CPC . *G01N 35/00693* (2013.01); *G01N 35/00623* (2013.01); *G01N 35/1011* (2013.01)

(58) Field of Classification Search
CPC ....... G01N 35/00693; G01N 35/00623; G01N 35/1011
See application file for complete search history.

(56) References Cited

U.S. PATENT DOCUMENTS 6,370,942 B1     4/2002   Dunfee et al.
6,735,597 B1     5/2004   Paradies
(Continued)

FOREIGN PATENT DOCUMENTS

CN        1495427 A     5/2004
CN     101153858 A     4/2008
(Continued)

OTHER PUBLICATIONS

PCT International Search Report and Written Opinion dated Mar. 19, 2021 (9 Pages).
(Continued)

*Primary Examiner* — Michael J Dalbo
*Assistant Examiner* — Kaleria Knox

(57) ABSTRACT

A quality control method for a diagnostic analyzer includes performing a quality control test or a plurality of specimen tests; determining, with a controller, that a result of the quality control test or a plurality of specimen test results is outside of a threshold; monitoring one or more mechanical devices of the diagnostic analyzer with the controller; receiving, by the controller, an error code indicating an error in a mechanical device of the one or more mechanical devices; and initiating a calibration procedure in response to the result of the quality control test or the plurality of specimen test results being outside of the threshold and receiving the error code. Other apparatus and methods are disclosed.

22 Claims, 5 Drawing Sheets

(56)                References Cited

U.S. PATENT DOCUMENTS

| | | | |
|---|---|---|---|
| 6,937,955 B2 | 8/2005 | Barnes | |
| 7,203,619 B2 | 4/2007 | Parvin et al. | |
| 7,359,536 B2 | 4/2008 | Hays et al. | |
| 7,727,181 B2 | 6/2010 | Rush | |
| 7,865,314 B1 | 1/2011 | Ohm | |
| 8,059,001 B2 | 11/2011 | Parvin et al. | |
| 8,099,257 B2 | 1/2012 | Parvin et al. | |
| 9,151,769 B2 | 10/2015 | Hammond et al. | |
| 9,483,441 B2 | 11/2016 | Li et al. | |
| 10,395,357 B2 | 8/2019 | Vivet et al. | |
| 2003/0179445 A1* | 9/2003 | Maenle | G02B 21/0016 |
| | | | 359/368 |
| 2007/0100569 A1* | 5/2007 | DeSimas | G01D 18/002 |
| | | | 702/85 |
| 2007/0198213 A1 | 8/2007 | Parvin et al. | |
| 2009/0215183 A1* | 8/2009 | Takehara | G01N 35/00623 |
| | | | 422/67 |
| 2011/0308313 A1 | 12/2011 | Azimi et al. | |
| 2013/0139616 A1 | 6/2013 | Yamamoto et al. | |
| 2013/0151189 A1 | 6/2013 | Li et al. | |
| 2016/0356800 A1* | 12/2016 | Glavina | G01N 35/00871 |
| 2016/0370396 A1* | 12/2016 | Wasson | G01N 35/00029 |
| 2017/0370956 A1 | 12/2017 | Hurwitz et al. | |
| 2018/0089870 A1* | 3/2018 | Billi-Duran | G06Q 10/20 |
| 2018/0289870 A1 | 10/2018 | Beasley et al. | |
| 2019/0033209 A1 | 1/2019 | Kluckner et al. | |
| 2019/0302136 A1 | 10/2019 | Ashida et al. | |

FOREIGN PATENT DOCUMENTS

| | | | | | |
|---|---|---|---|---|---|
| CN | 102439459 A | | 5/2012 | | |
| CN | 104395729 A | | 3/2015 | | |
| CN | 104755930 A | | 7/2015 | | |
| CN | 110174587 A | * | 8/2019 | | |
| JP | H02-284039 A | | 11/1990 | | |
| JP | 2000-266756 A | | 9/2000 | | |
| JP | 2001-330617 A | | 11/2001 | | |
| JP | 2003-533701 A | | 11/2003 | | |
| JP | 2012-32309 A | | 2/2012 | | |
| JP | 2019-49568 A | | 3/2019 | | |
| JP | 2019-174424 A | | 10/2019 | | |
| WO | WO-2015157340 A1 | * | 10/2015 | | G06Q 10/06 |

OTHER PUBLICATIONS

Extended EP Search Report dated May 11, 2023 of corresponding European Application No. 20901659.1, 4 Pages.

* cited by examiner

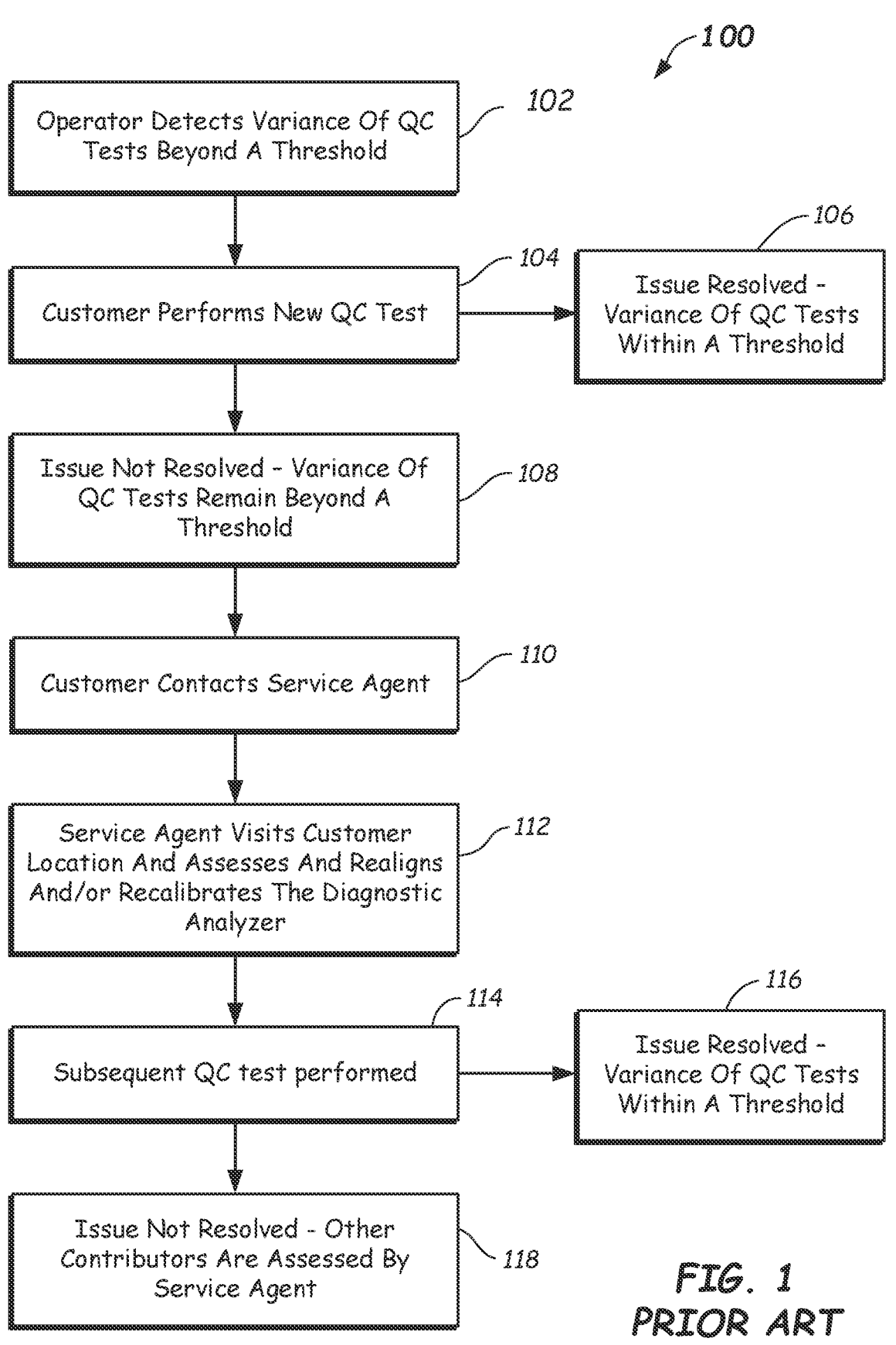

*100*

*102* Operator Detects Variance Of QC Tests Beyond A Threshold

*104* Customer Performs New QC Test

*106* Issue Resolved - Variance Of QC Tests Within A Threshold

*108* Issue Not Resolved - Variance Of QC Tests Remain Beyond A Threshold

*110* Customer Contacts Service Agent

*112* Service Agent Visits Customer Location And Assesses And Realigns And/or Recalibrates The Diagnostic Analyzer

*114* Subsequent QC test performed

*116* Issue Resolved - Variance Of QC Tests Within A Threshold

*118* Issue Not Resolved - Other Contributors Are Assessed By Service Agent

*FIG. 1*
*PRIOR ART*

DIAGNOSTIC ANALYZERS AND QUALITY CONTROL METHODS

CROSS REFERENCE TO RELATED APPLICATIONS

This disclosure is a 371 of PCT/US2020/064643, filed Dec. 11, 2020, which claims the benefit of U.S. Provisional Patent Application No. 62/948,754, entitled "DIAGNOSTIC ANALYZERS AND QUALITY CONTROL METHODS," filed Dec. 16, 2019, the disclosures of which are hereby incorporated by reference in their entireties for all purposes.

FIELD

Embodiments of this disclosure relate to apparatus and methods adapted to provide quality control in diagnostic analyzers.

BACKGROUND

In medical testing and processing, diagnostic analyzers (immunoassay instruments, clinical diagnostic analyzers, in vitro analyzers, and the like) may be used to test for concentrations of one or more constituents (e.g., one or more analytes or other component(s)) contained within a biological specimen, such as, e.g., blood or a component thereof such as serum or plasma, urine, sputum, saliva, cerebrospinal liquids, and the like. Such diagnostic analyzers may be complex and may perform hundreds or even thousands of diagnostic tests (hereinafter "specimen tests") on specimens each day. In order to ensure that the results of the specimen tests produced by a diagnostic analyzer are valid, typically a series of replicate quality control tests (hereinafter "replicate QC tests") may be performed thereon using quality control samples that are carefully prepared to produce an expected result.

If one of the replicate QC tests produces an unexpected result, the diagnostic analyzer may be considered to be "out of control." That is, the diagnostic analyzer is operating unacceptably and all of the specimen test results produced by that diagnostic analyzer since the last successful replicate QC tests may be questionable and thus may have to be discarded or possibly rerun.

Accordingly, apparatus and methods that can improve quality control in diagnostic analyzers are sought.

SUMMARY

According to a first aspect, a quality control method for a diagnostic analyzer is provided. The quality control method includes performing a quality control test or a plurality of specimen tests; determining, with a controller, that a quality control test result or a plurality of specimen test results is outside of a threshold; monitoring one or more mechanical devices of the diagnostic analyzer with the controller; receiving, by the controller, an error code indicating an error in a mechanical device of the one or more mechanical devices; and initiating a calibration procedure in response to the quality control test result or the plurality of specimen test results being outside of the threshold and receiving the error code.

According to a second aspect, a diagnostic analyzer is provided. The diagnostic analyzer includes a controller configured to perform a quality control test or a plurality of specimen tests; determine that a quality control test result or a plurality of specimen test results is outside of a threshold;

monitor one or more mechanical devices of the diagnostic analyzer; receive an error code indicating an error in a mechanical device of the one or more mechanical devices; and initiate a calibration procedure in response to the quality control test result or the plurality of specimen test results being outside of the threshold and receiving the error code.

According to a third aspect, a quality control method is provided. The quality control method includes performing a quality control test; determining, with a controller, that a variance in the quality control tests is outside of a threshold; monitoring one or more mechanical devices of the diagnostic analyzer with the controller; receiving, by the controller, an error code indicating an error in a mechanical device of the one or more mechanical devices; and initiating a calibration procedure by the controller in response to the variance in the quality control tests being outside of the threshold and receiving the error code.

Still other aspects, features, and advantages of the disclosure may be readily apparent from the following detailed description illustrating a number of example embodiments. This disclosure may also be capable of different embodiments, and its several details may be modified in various respects. Accordingly, this disclosure covers all modifications, equivalents, and alternatives falling within the scope of claims.

BRIEF DESCRIPTION OF THE DRAWINGS

FIG. 1 illustrates a flowchart of actions taken when an occurrence of a high variance in a quality control test or a series of specimen tests is noted by an operator of a diagnostic analyzer according to the prior art.

DETAILED DESCRIPTION

Figure 2:
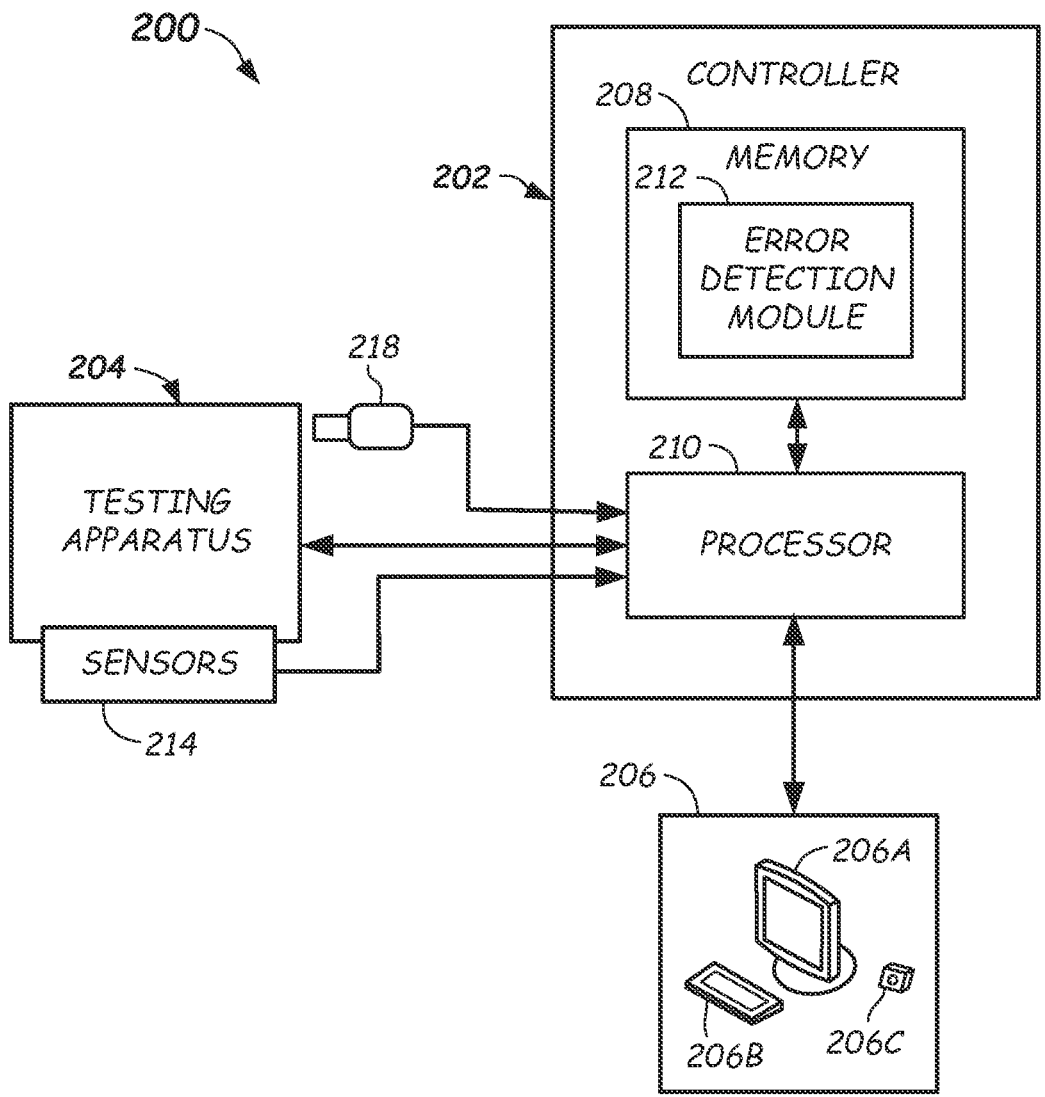
FIG. 2 illustrates a schematic block diagram of a diagnostic analyzer according to one or more embodiments of the disclosure.

Diagnostic analyzers may rely on quality control (QC) tests to ensure that diagnostic test results produced by the diagnostic analyzers are valid. A QC test may involve testing a QC sample in the diagnostic analyzer and comparing the QC sample test result with an expected result for that QC sample. In some embodiments, a QC test may include performing a plurality of tests using a replicate QC sample. A QC sample may contain a specific concentration of a chemical (e.g., an analyte) being tested and will cause the diagnostic analyzer to output an expected test result if the diagnostic analyzer is operating properly. If a diagnostic analyzer does not produce the expected test result in response to a QC test, the diagnostic analyzer may be considered to be "out of control" and all of the test results produced by that diagnostic analyzer since the last successful QC test may be called into question. For example, if there is a high variance in the QC tests, then the diagnostic analyzer may be considered to be out of control. Conventional methods of operating diagnostic analyzers provide for calling a service agent into a laboratory to fix a diagnostic analyzer when a determination is made that the diagnostic analyzer is out of control.

Reference is now made to FIG. 1, which illustrates a flowchart of a prior art method 100 of operating a diagnostic analyzer. First, in block 102, an operator of the diagnostic analyzer detects a variance of QC tests outside a threshold. For example, the diagnostic analyzer may periodically perform QC tests (e.g., replicate QC tests) to assure the integrity of the diagnostic analyzer and a variance of these QC tests may be outside the threshold. In block 104, the operator may perform a new QC test on the diagnostic analyzer in response to the variance of the QC tests of block 102 being outside the threshold. The new QC test may be of the same type of QC test that was performed to reach the result in block 102.

If the variance of the QC tests is within a threshold after performing the new QC test in block 104, processing proceeds to block 106 where the issue with the diagnostic analyzer is resolved. For example, when the variance in QC tests is within the threshold after the new QC test is performed, the operator of the diagnostic analyzer may be confident that the diagnostic analyzer is operating properly. If running the new QC test in block 104 results in the variance of QC tests remaining outside a threshold, processing proceeds to block 108 where the issue with the diagnostic analyzer is not resolved. In block 108, the diagnostic analyzer may be out of control.

With the variance in the QC being outside the threshold after running the new QC test in block 104, the user contacts a service agent as described in block 110. The service agent may be a representative of the manufacturer of the diagnostic analyzer, for example. In block 112, the service agent visits the location of the diagnostic analyzer to service the diagnostic analyzer and assesses and possibly realigns and/ or recalibrates the diagnostic analyzer. A subsequent QC test is performed on the diagnostic analyzer in block 114. The subsequent QC test may be of the same type of QC test performed in block 104.

In block 116, the issue with the diagnostic analyzer is resolved. For example, after the subsequent QC test is performed, the variance of the QC tests is within a threshold. Thus, the alignment and/or recalibration performed by the service agent resolved the issue with the diagnostic analyzer. If the variance of the QC tests remains outside a threshold after the subsequent QC test is run in block 114, processing proceeds to block 118 where the issue with the diagnostic analyzer is not resolved. Other contributors may be assessed by the service agent to determine whether the other contributors are causing the issue with the diagnostic analyzer.

In the method 100 of FIG. 1, the service agent visits the site of the diagnostic analyzer to perform the above-described realignment and/or recalibration of the diagnostic analyzer. During the time that the service agent is in transit and at the site of the diagnostic analyzer, the diagnostic analyzer may not be able to operate properly and may not be able to perform one or more diagnostic tests. Thus, diagnostic testing may become significantly delayed. The delay may result in test specimens having to be sent to other diagnostic analyzers, which is time consuming and costly.

In view of the foregoing, one or more embodiments of the disclosure provide quality control methods and apparatus configured and operable to detect when a diagnostic analyzer is not operating properly. The methods and apparatus may initiate alignment and/or calibration procedures that may be performed without a service agent present at the diagnostic analyzer. The methods and apparatus may analyze specimen test results and/or QC test results (e.g., replicate QC test results) performed by the diagnostic analyzer. For example, the methods and apparatus may compare test results from specimen tests with expected test results to determine if the diagnostic analyzer is operating properly. In other embodiments, a variance in QC tests may be analyzed to determine if the variance in QC tests is outside a threshold. The analysis of the specimen test results and/or the variance in QC tests may indicate that the diagnostic analyzer is not operating properly or that the diagnostic analyzer is out of control.

In accordance with one or more embodiments of the disclosure, a controller of the diagnostic analyzer, once it has determined an error exists, may automatically prompt the operator of the diagnostic analyzer to perform one or more calibration procedures. In some embodiments, the one or more calibration procedures may include one or more automated calibration procedures. In other embodiments, the one or more calibration procedures may be performed by the user of the diagnostic analyzer. Thus, the controller may prompt the user to initiate one or more calibration procedures, which can be undertaken without a service agent present at the diagnostic analyzer. Accordingly, the one or more calibration procedures save time and reduce costs.

These and other aspects and features of embodiments of the disclosure will be described with reference to FIGS. 2 through 5.

Reference is now made to FIG. 2, which illustrates a block diagram of a diagnostic analyzer 200 according to one or more embodiments. The diagnostic analyzer 200 may include a controller 202, a testing apparatus 204, and a user interface 206. The diagnostic analyzer 200 may be configured to perform one or more diagnostic tests and/or analyses on biological specimens as described herein.

The controller 202 may include a memory 208 (e.g., RAM, ROM, or other devices) configured to store programming instructions, test results, and/or other information/data. In some embodiments, the controller 202 may be separate from the testing apparatus 204. For example, the controller 202 may be integrated into a laboratory information system (LIS). The controller 202 may include a processor 210 that is configured to run programming instructions stored in the memory 208. The processor 210 may also be configured to communicate with one or more devices within the diagnostic analyzer 200. In some embodiments, the processor 210 may be configured to communicate with devices (not shown) that are external to the diagnostic analyzer, such as computer servers, computer workstations, and an LIS. The processor 210 may be or may include a central processing unit (CPU), a microprocessor, and/or the like.

The memory 208 may store an error detection module 212 that may be programming instructions that, when executed by the processor 210, cause the processor 210 to monitor the testing apparatus 204. The error detection module 212 may also cause the processor 210 or programs executed by the processor 210 to identify errors, such as errors with components of the testing apparatus 204. Other programming instructions stored in the memory 208 may cause the processor 210 to operate the diagnostic analyzer 200, including the testing apparatus 204, as described herein.

The testing apparatus 204 may be configured to perform analyses on different specimen types, such as patient specimens and QC samples. The testing apparatus 204 may be controlled by instructions transmitted by the processor 210. In addition, test results from the analyses may be transmitted from the testing apparatus 204 to the processor 210. Programs executing by the processor 210 may analyze the test results, which may be used to determine the operational status of the diagnostic analyzer 200 as described herein.

The testing apparatus 204 may include one or more sensors 214 that may monitor one or more devices within the testing apparatus 204. For example, the one or more sensors 214 may monitor electronic devices, mechanical devices, and other devices within the testing apparatus 204. The one or more sensors 214 and/or the processor 210 may generate an error code identifying an error with a component, such as a defective motor, or an error with a process performed by the testing apparatus 204. The one or more sensors 214 and/or the processor 210 may identify a reason for an error, such as a misaligned component caused by crash of the component within the testing apparatus 204.

In some embodiments, the one or more mechanical devices may include one or more encoders that may be configured to monitor positions of one or more mechanical devices and/or moveable devices. For example, the one or more encoders may generate data identifying the position of one or more movable devices and/or mechanical devices within the testing apparatus 204. The one or more sensors 214, in conjunction with the controller 202, may generate data, such as an error code, indicating an error with a position of an encoder and/or alignment of a movable device. In some embodiments, one or more mechanical devices or electrical devices may include one or more hall-effect sensors. In some embodiments, the one or more hall-effect sensors may be configured to monitor positions of one or more moveable devices and/or the one or more mechanical devices. The one or more sensors 214, in conjunction with the controller 202, may detect an error with a hall-effect sensor.

In some embodiments, one or more mechanical devices or electrical devices may include one or more motors within the testing apparatus 204 that may move one or more movable devices. The one or more sensors 214, in conjunction with the controller 202, may generate data, such as an error code, indicating an error with a motor. An error code associated with a motor detected by the one or more sensors 214 may indicate a short circuit associated with the motor and/or an undervoltage condition associated with the motor.

In some embodiments, the one or more sensors 214, in conjunction with the controller 202, may generate data, such as an error code, indicating an error with a movable device. In some embodiments, the error code may indicate a crash of a movable device. In some embodiments, a movable device may be a pipette and an error code may indicate a crash of the pipette as described herein.

In some embodiments, one or more mechanical devices may include an aspiration device. The one or more sensors 214, in conjunction with the controller 202, may generate data, such as an error code, indicating an error with the aspiration device. An error code may indicate a pressure associated with the aspiration device being outside a threshold or an average pressure associated with the aspiration device being outside a threshold.

The one or more sensors 214 may also include thermometers, bar code readers, barometers, and/or other sensors. The one or more sensors 214 may be internal and/or external to the testing apparatus 204 and may be configured to provide various measurements related to the operation of diagnostic analyzer 200. These measurements may include, but are not limited to, internal temperature of the testing apparatus 204, level of internal vibrations of the testing apparatus 204, humidity level, and atmospheric pressure. Other measurements/data related to the operation of diagnostic analyzer 200 may be provided.

The error detection module 212 may be configured to analyze data generated by the one or more sensors 214 as described above. In addition, the error detection module 212 may analyze results of tests performed by the testing apparatus 204. For example, the error detection module 212 may determine whether the one or more sensors 214 have detected an error. The error detection module 212 may also analyze patient sample test results and/or variance of QC tests to determine whether the diagnostic analyzer 200 is operating properly. If the diagnostic analyzer 200 is not operating properly, the controller 202 may initiate processes to correct the operation of the diagnostic analyzer 200 as described herein.

The diagnostic analyzer 200 may also include an imaging device 218 that may capture images of items being tested by the testing apparatus 204. For example, the imaging device 218 may capture images of specimens, specimen containers, and/or bar code labels affixed to specimen containers. The imaging device 218 may capture images of other items.

The user interface 206 may include one or more devices that enable a user of the diagnostic analyzer 200 to input data to the diagnostic analyzer 200, such as to the processor 210. The user interface 206 may also enable the diagnostic analyzer 200 to convey data and information to the user. In some embodiments, the user interface 206 may include a monitor 206A, such as a computer monitor, a keyboard 206B, and/or a computer mouse 206C.

Figure 3:
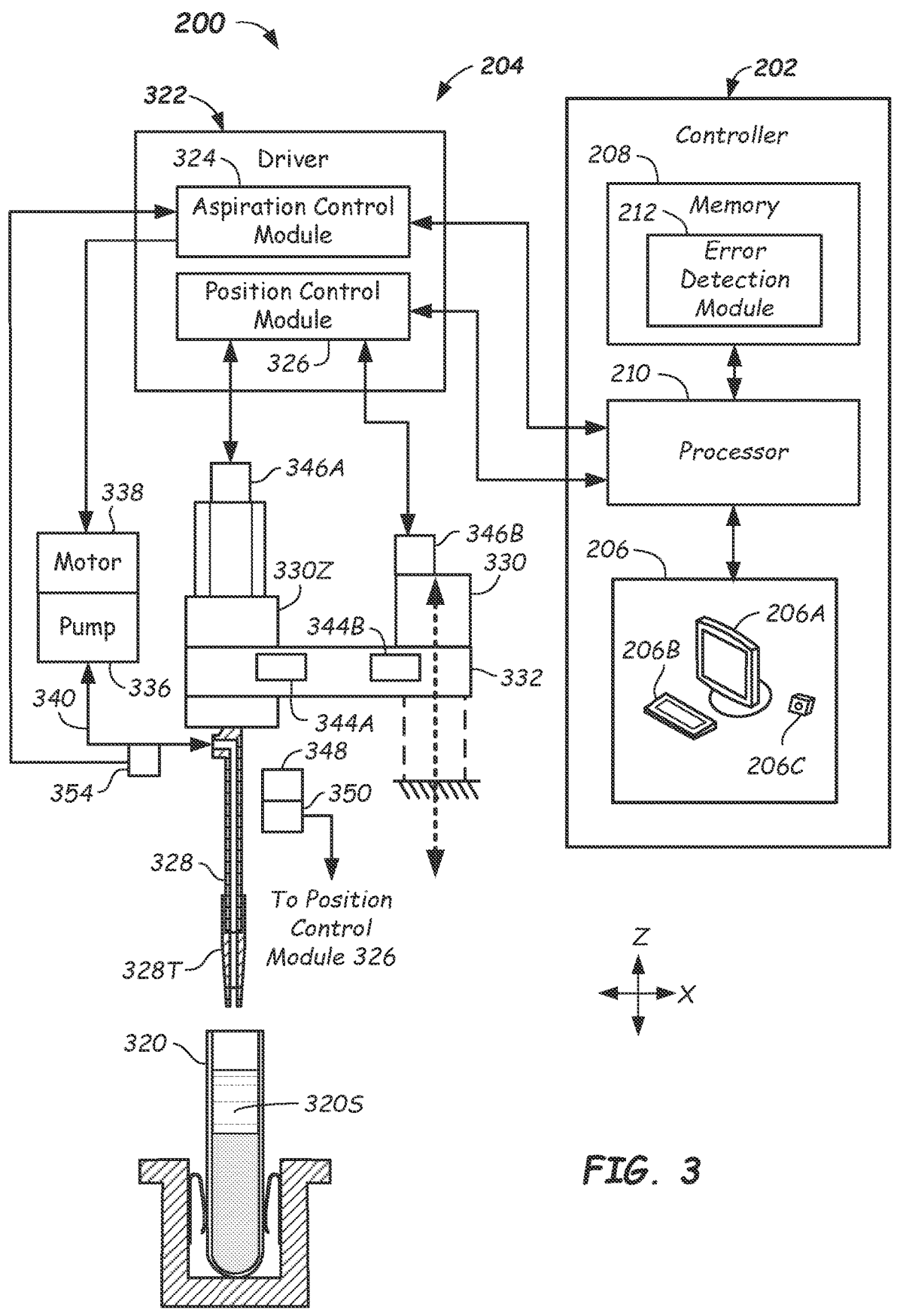
FIG. 3 illustrates a detailed schematic block diagram of a diagnostic analyzer according to one or more embodiments of the disclosure.

Additional reference is made to FIG. 3, which illustrates a block diagram of a more detailed embodiment of the diagnostic analyzer 200. The diagnostic analyzer 200 may analyze specimens, such as specimen 320S, located within a specimen container 320. In some embodiments, the specimen 320S may be a QC sample that has a precise and known concentration of an analyte that may be used to calibrate the diagnostic analyzer 200. In some embodiments, the specimen 320S may be a specimen (e.g., a biological sample) from a patient, wherein the diagnostic analyzer 200 determines a concentration of one or more analytes located in the specimen 320S.

The diagnostic analyzer 200 may include a driver 322 that is electrically coupled between the controller 202 and various components of the testing apparatus 204. The driver 322 may receive signals from the processor 210 instructing various components within the testing apparatus 204 to move to certain locations, for example. The driver 322 may also transmit signals from the testing apparatus 204 to the controller 202 that indicate one or more operating conditions of the testing apparatus 204. In some embodiments, the driver 322 or components thereof may be implemented in the controller 202.

The driver 322 may include an aspiration control module 324 and a position control module 326. The driver 322 may include other modules and components. The aspiration control module 324 may control one or more aspiration processes performed by the testing apparatus 204. In some embodiments, the aspiration control module 324 may receive data generated by one or more sensors that monitor aspiration processes. The position control module 326 may control one or more motors that move one or more movable devices within the testing apparatus 204. In some embodiments, the position control module 326 may receive data generated by one or more sensors that monitor the movements of the one or more movable devices. The one or more sensors may include a hall-effect sensor and a position encoder. Other sensors may be included in the testing apparatus 204.

The testing apparatus 204 may include a pipette 328 having a removable pipette tip 328T attached thereto. The testing apparatus 204 may operate to move the pipette tip 328T and the specimen container 320 proximate each other. The testing apparatus 204 may then move the pipette tip 328T into the specimen container 320 to aspirate the specimen 320S. The pipette 328 may also be used in a similar manner to dispense a liquid into the specimen container 320.

The testing apparatus 204 may include one or more motors that move the pipette 328 to specific locations such as proximate the specimen container 320. The motors may also be used to move other moveable devices within the testing apparatus 204. In the embodiment depicted in FIG. 3, the testing apparatus 204 includes a motor 330 that is configured to move the pipette 328 in a plane defined by an x-axis and a y-axis, wherein the y-axis is into the paper. In some embodiments, the motor 330 may move a movable member 332 that is coupled between the motor 330 and the pipette 328. The testing apparatus 204 may also include a z-motor 330Z that is configured to move the pipette 328 in a z-direction, such as into and out of the specimen container 320. The motor 330 and the z-motor 330Z may receive signals from the position control module 326 that cause the motor 330 and the z-motor 330Z to move the pipette 328 to specific locations.

The testing apparatus 204 may include a pump 336 operated by a motor 338, wherein the motor 338 may be operational by instructions provided by the aspiration control module 324. During aspiration and dispensing, the pump 336 may cause a pressure in a conduit 340 between the pump 336 and the pipette 328. In some embodiments, the pump 336 may be used to aspirate and dispense liquids out of and into the specimen container 320.

The testing apparatus 204 may include one or more sensors that provide status of the testing apparatus 204. For example, the one or more sensors may provide data to the processor 210 indicating the status of one or more mechanical and/or electrical components associated with the one or more sensors. In some embodiments, one or more sensor may include one or more encoders. In some embodiments, the one or more encoders monitor position of the one or more mechanical devices in the testing apparatus 204. In the embodiment depicted in FIG. 3, the testing apparatus 204 includes a first encoder 344A and a second encoder 344B. The first encoder 344A may provide data regarding the vertical position of the pipette 328 (e.g., along a z-axis). The second encoder 344B may provide data regarding the position of the pipette 328 in the X-Y plane. The first encoder 344A may include a sensor that provides data indicating that an error may be present with the first encoder 344A. The second encoder 344B may also include a sensor that provides data indicating that an error may be present with the second encoder 344B. For example, the sensors may indicate that the first encoder 344A and the second encoder 344B are not positioned correctly or that data provided by the first encoder 344A and the second encoder 344B is not correct.

In some embodiments, the first encoder 344A and the second encoder 344B may be sensors that, in conjunction with the controller 202 or other devices, diagnose errors with the motor 330 and/or the z-motor 330Z. For example, the first encoder 344A and the second encoder 344B may provide position data of the pipette 328. This position data may be compared to expected position data, such a data stored or provided by the position control module 326, to determine whether the motor 330 and/or the z-motor 330Z are misaligned. For example, the position control module 326 may move the pipette 328 to a known location within the testing apparatus 204. If the pipette 328, the first encoder 344A, and the second encoder 344B are aligned properly and operating properly, data provided by the first encoder 344A and the second encoder 344B should match the known location in the testing apparatus 204.

The diagnostic analyzer 200 may include a motor sensor 346A that senses one or more parameters of the z-motor 330Z and transmits a signal indicating the one or more parameters. In some embodiments, the signal is an error code. The motor sensor 346A may measure current into the z-motor and/or voltage at the z-motor. If no current flow is measured into the z-motor by the motor sensor 346A, then the motor sensor 346A may generate a signal (e.g., an error code) indicating that the z-motor has an open circuit error. In some embodiments, the motor sensor 346A may transmit a signal indicative of the current to the error detection module 212 (or other device), wherein the error detection module 212 determines that an open circuit condition or a high current condition exists with the z-motor 330Z. If voltage below a predetermined threshold is measured at the z-motor by the motor sensor 346A, the motor sensor 346A may generate a signal indicating a short circuit or an undervoltage condition within the z-motor 330Z. In some embodiments, the motor sensor 346A may generate an error code that identifies a specific error detected by the motor sensor 346A. In other embodiments, the error code may be generated by the error detection module 212. A motor sensor 346B may detect similar error(s) and/or parameters with the motor 330. The motor sensor 346B may be similar or identical to the motor sensor 346A. The motor sensor 346A and the motor sensor 346B may detect other errors with the motors.

The diagnostic analyzer 200 may include one or more hall-effect sensors that may be configured to sense positions of one or more movable devices, such as the pipette 328. An embodiment of the hall-effect sensor 348 includes a coil that may be attached to a location within the diagnostic analyzer. A moveable device may have a magnet located thereon. As the magnet passes close to the hall-effect sensor 348, the interaction of the magnet and the coil generates a current that may be detected by a detector, such as a detector within the position control module 326. Thus, the hall-effect sensor 348 provides data regarding the position of a moving device located within the testing apparatus 204.

The hall-effect sensor 348 may have an error sensor 350 associated therewith. The error sensor 350, in conjunction with the controller 202, may detect one or more errors with the hall-effect sensor 348 and may generate one or more error codes in response to detection of an error. In some embodiments, the error sensor 350 may detect an open circuit in the coil within the hall-effect sensor 348. In some embodiments, the error sensor 350 may detect a short circuit in the coil. In some embodiments, the position control module 326 may cause the pipette 328 to move proximate the hall-effect sensor 348 to cause the hall-effect sensor 348 to generate a signal indicating that the pipette 328 is proximate the hall-effect sensor 348. In the event that the hall-effect sensor 348 does not generate such a signal, the diagnostic analyzer 200 may flag an error with the hall-effect sensor 348. Other error detection devices and methods may be used. The hall-effect sensor 348 or other hall-effect sensors may be in other locations within the testing apparatus 204 to detect the positions of other movable devices.

The testing apparatus 204 may include an aspiration device, which in the embodiment depicted in FIG. 3 includes the pump 336 and the conduit 340. The testing apparatus 204 may include a pressure sensor 354 configured to measure pressure in the conduit 340, which may indicate the operating status of the aspiration device. For example, during aspiration and/or dispensing, the pressure sensor 354 may measure the pressure in the conduit 340. The pressure sensor 354 may transmit a signal indicating that the pressure in the conduit 340 is above a predetermined pressure, below a predetermined pressure, and/or outside a predetermined pressure range. In some embodiments, an error may be detected in response to an average pressure measured in the conduit 340 being above a predetermined pressure, below a predetermined pressure, and/or outside a predetermined pressure range. For example, low pressure in the conduit 340 may be indicative of a leak between the pump 336 and the pipette 328. High pressure in the conduit 340 may be indicative of blockage in the conduit 340 and/or the pipette 328.

The monitor 206A may display the status of the diagnostic analyzer 200. For example, during operation of the diagnostic analyzer 200, the monitor 206A may display data generated by one or more of the sensors and or the error detection module 212. If an error code is detected, the monitor 206A may display the error code. The monitor 206A may also display instructions prompting the user of the diagnostic analyzer 200 to initiate a calibration procedure. For example, initiating a calibration procedure may include providing instructions to the user to perform a calibration procedure. The instructions may also include procedures to be performed by the user to complete the calibration procedure. Calibration procedures may include alignment procedures.

Figure 4:
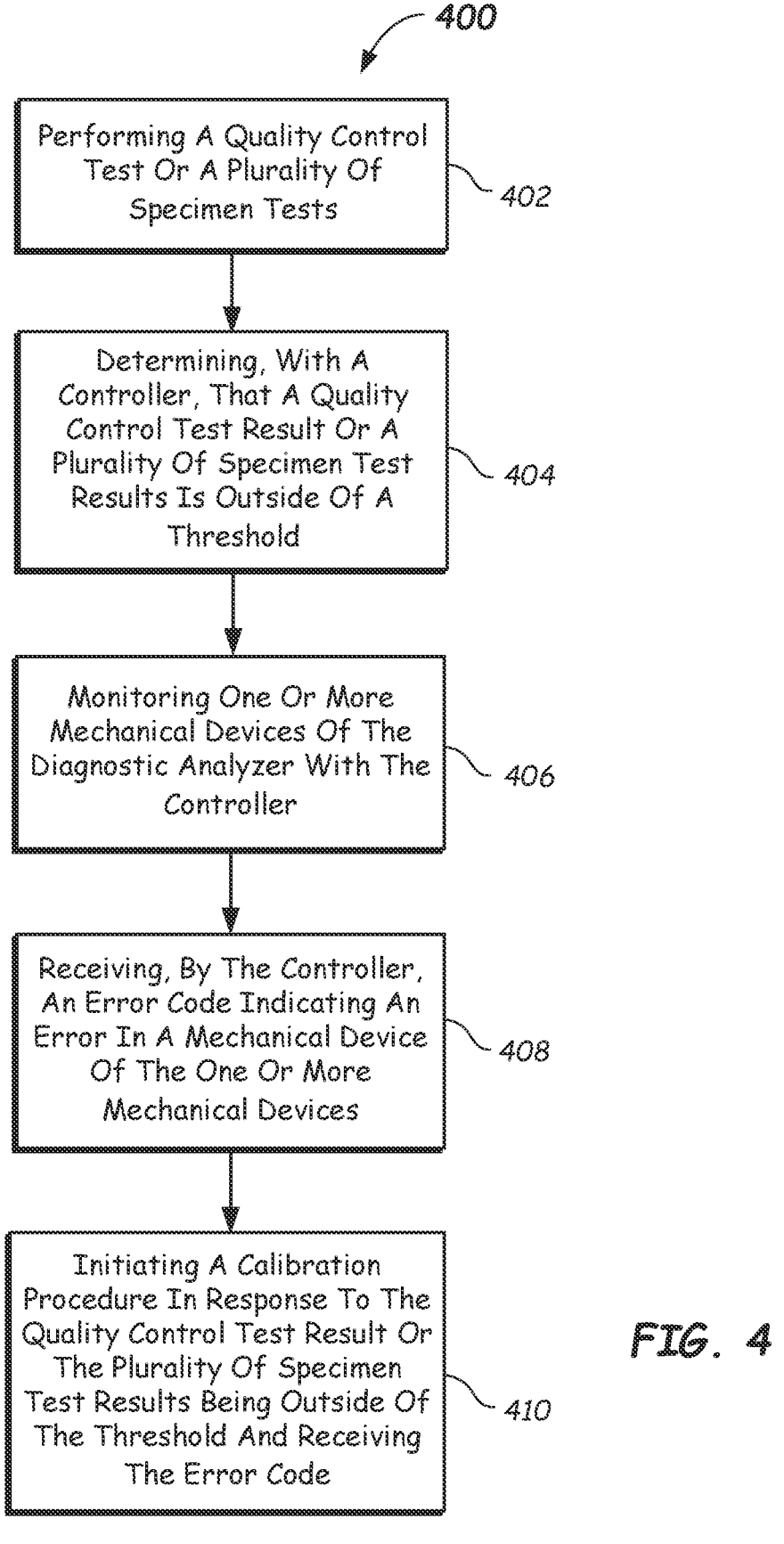
FIG. 4 illustrates a flowchart describing a method of operating a diagnostic analyzer according to one or more embodiments of the disclosure.

Additional reference is now made to FIG. 4, which is a flowchart describing an embodiment of a quality control method 400 for the diagnostic analyzer 200. The method 400 may be performed at least in part by the controller 202. For example, instructions to perform at least portions of the method 400 may be stored in the memory 208 and executed on the processor 210.

In block 402, a quality control (QC) test or a plurality of specimen tests are performed. For example, the controller 202 may store a moving average of specimen test results. In some embodiments, the controller may calculate a variance of QC tests. In some embodiments, performing the QC test may include testing one or more QC samples. In some embodiments, performing the QC test may include testing replicate QC samples. In block 404, a quality control test result or a plurality of specimen test results is determined to be outside of a threshold. In some embodiments, the variance in QC tests is determined to be outside a threshold. In some embodiments, a test result is outside of a threshold if the test result is outside of a range, which may have an upper threshold and a lower threshold. The test result is considered outside of the threshold if the test result is above the upper threshold or below the lower threshold. In the case of a single threshold, the test result being outside of the threshold depends on whether the threshold is an upper limit or a lower limit. Being above an upper limit is considered outside of the threshold and being below a lower limit is considered outside of the threshold.

A QC sample may include a known concentration of an analyte. Accordingly, when the QC sample is tested, the result of the test will be the known concentration if the diagnostic analyzer 200 is operating properly. Likewise, if the diagnostic analyzer 200 is operating properly, the variance of the QC tests will be within a threshold.

In some embodiments, the diagnostic analyzer 200 may analyze a plurality of specimen tests to determine if the results of the specimen tests are drifting to a threshold in block 404. For example, normal specimen test results may be between a first threshold and a second threshold, below a threshold, or greater than a threshold. A plurality of the specimen test results may be analyzed to determine whether the test results are approaching a threshold. For example, a moving average of test results may be analyzed to determine if the moving average is approaching a threshold, which may be indicative of an error in the diagnostic analyzer 200. In some embodiments, outlier and/or anomaly test results are not included in the moving average analysis. In some embodiments, a sharp change in the moving average of the test results may be indicative of an error in the diagnostic analyzer 200.

In block 406, one or more mechanical devices of the diagnostic analyzer 200 are monitored. The mechanical devices may include the above-described mechanical devices in addition to other mechanical devices. For example, the motors, hall-effect sensor 348, pipette 328, encoders 344A-344B, pump 336, and/or other devices may be monitored. In block 408 an error code indicating an error in a mechanical device of the one or more mechanical devices or a process may be received by and/or generated by the controller 202.

In block 410, a calibration procedure is initiated in response to the quality control test result or the plurality of specimen test results being outside of the threshold and the generation or receipt of the error code. In some embodiments, the calibration procedure is initiated in response the variance in the QC tests being outside a threshold and generation of the error code. In some embodiments, initiating a calibration procedure may include prompting a user of the diagnostic analyzer 200 to initiate or perform a calibration procedure. For example, the processor 210 may output a prompt via the monitor 206A that instructs a user to perform a calibration procedure. In some embodiments, initiating a calibration procedure may include instructing a user as to procedures for performing a calibration procedure. For example, calibration instructions may be provided on the monitor 206A. In some embodiments, initiating a calibration procedure includes causing the diagnostic analyzer 200 to perform an automated calibration procedure. For example, the processor 210 may execute instructions stored in memory 208 that cause mechanical devices and/or electronic devices within the diagnostic analyzer 200 to perform an automatic calibration procedure as described herein.

Several calibration procedures may be performed in the diagnostic analyzer 200. In some embodiments, a calibration procedure may include aligning an encoder or calibrating the output of an encoder in response to an error code indicating an error with an encoder. Referring to the first encoder 344A, calibration may be required after an error code is generated indicating a crash of the pipette 328 or crash of another movable device. In some embodiments, calibration of the pipette 328 includes moving the pipette 328 to a predetermined position. For example, instructions may be transmitted from the processor 210 to the position control module 326 that instruct the position control module 326 to move the pipette 328 to the predetermined position. Data regarding the position of the pipette 328 may be transmitted from at least one of the first encoder 344A or the second encoder 344B to the position control module 326. The position data provided by at least one of the first encoder 344A or the second encoder 344B should match the predetermined position of the pipette 328.

In situations where the predetermined position of the pipette 328 does not match data provided by at least one of the first encoder 344A or the second encoder 344B, a calibration procedure may be performed. In some embodiments, the calibration procedure may be performed automatically by the diagnostic analyzer 200 (e.g., by the controller 202). In some embodiments, the calibration procedure may be performed by a user in response to instructions provided by the controller 202. In an automatic calibration procedure, the controller 202 and/or the position control module 326 may internally offset the data provided by at least one of the first encoder 344A or the second encoder 344B to match data of the predetermined position of the pipette 328. In another embodiment, the user may adjust at least one of the first encoder 344A or the second encoder 344B until data provided therefrom matches data corresponding to the predetermined position of the pipette 328.

The hall-effect sensor 348 is another position sensor in the embodiment of the diagnostic analyzer 200 depicted in FIG. 3. The error sensor 350 and/or the position control module 326 may generate an error code indicating an error with the hall-effect sensor 348. In some embodiments, the position control module 326 may move the pipette 328 past the hall-effect sensor 348, which should cause the hall-effect sensor 348 to generate a signal. If no signal is generated by the hall-effect sensor 348, an error code indicating an error with the hall-effect sensor 348 may be generated. A calibration procedure may be performed by moving the pipette 328 in locations within the testing apparatus 204 to determine if the hall-effect sensor 348 has moved and should be realigned. Realignment may involve physically moving the hall-effect sensor 348 to a correct position.

In some embodiments, a calibration procedure may include testing the hall-effect sensor 348. For example, the error sensor 350 may measure an impedance (e.g., a resistance) of the coil in the hall-effect sensor 348. This calibration procedure may be performed automatically by the controller 202 or manually by a user. The error sensor 350 may measure a high impedance indicating an open circuit in the hall-effect sensor 348. The error sensor 350 may measure a very low impedance indicating a short circuit in the hall-effect sensor 348.

The calibration procedures of at least one of the first encoder 344A or the second encoder 344B and the hall-effect sensor 348 may align the pipette 328. For example, the calibration procedures assure that data generated by the first encoder 344A, the second encoder 344B, and the hall-effect sensor 348 provide accurate data of the position of the pipette 328. These calibration procedures may be performed in response to an error code indicating a crash of a movable device (e.g., the pipette 328) within the testing apparatus 204.

In some embodiments, a crash of one or more movable devices within the diagnostic analyzer 200 may be detected by current to and/or voltage at a motor coupled to a movable device. When a moveable device crashes, the motor coupled to the movable device may suddenly draw significant current and/or have a sudden change in voltage. A sudden rise in current and/or a change in voltage to the motor 330 or the z-motor 330Z may indicate that a movable device coupled to the motor 330 or the z-motor 330Z has encountered an object that prevents or obstructs movement of the movable device. For example, if the motor sensor 346A senses a current increase and/or a voltage change at the z-motor 330Z, the error detection module 212 may determine that the pipette 328 has encountered an obstacle. In a similar manner, if the motor sensor 346B senses a current increase and/or a voltage change at the motor 330, the error detection module 212 may determine that the pipette 328 or the movable member 332 has encountered an obstacle. If the error detection module 212 detects a crash, the error detection module 212 may instruct the processor 210 to initiate calibration procedures. After encountering an obstacle, the alignment of the movable device may become offset, which may be rectified by calibration and/or alignment. The calibration procedure may include aligning at least one of the first encoder 344A, the second encoder 344B, or the hall-effect sensor 348 as described herein.

In some embodiments, the error detection module 212 may determine that the z-motor 330Z and/or the motor 330 has an overcurrent condition (e.g., short circuit) or an overvoltage condition. In such situations, the error detection module 212 may instruct the processor 210 to notify an operator that an item is preventing one of the pipette 328 or the movable member 332 from moving. The processor 210 may instruct the operator to remove the obstruction and perform a calibration procedure as described above. The calibration procedure may include aligning at least one of the first encoder 344A, the second encoder 344B, or the hall-effect sensor 348 as described herein.

In some embodiments, errors associated with aspiration and/or dispensing may be sensed by the pressure sensor 354. For example, during aspiration and dispensing processes, the pressure sensor 354 may measure the pressure in the conduit 340, which may be the same pressure in the pump 336 and/or the pipette 328. In some embodiments, the error detection module 212 may identify an error if the pressure sensed by the pressure sensor 354 is outside a threshold. For example, if during aspiration, the pressure sensed by the pressure sensor 354 is greater than a first threshold, the error detection module 212 may indicate that the aspiration system has a clog. The error detection module 212 may also indicate that the pump 336 is pumping too hard and may instruct the processor 210 to calibrate the pressure of the pump 336. If the pressure sensed by the pressure sensor 354 is less than a second threshold during aspiration, the error detection module may indicate that the aspiration system has a leak. The error detection module 212 may also indicate that the pump 336 is pumping too weak and may instruct the processor 210 to calibrate the pressure of the pump 336.

Subsequent to the calibration procedure, a subsequent QC test may be performed to determine if the diagnostic analyzer 200 is operating properly. In some embodiments, the error detection module 212 may determine if the QC test result is within a threshold. In some embodiments, the error detection module 212 may determine if the variance in the QC tests is within a threshold, which indicates that the diagnostic analyzer 200 is operating correctly. If the result of the subsequent QC test indicates that the diagnostic analyzer 200 is not operating properly, the user of the diagnostic analyzer may contact a service agent to perform other procedures on the diagnostic analyzer 200.

Figure 5:
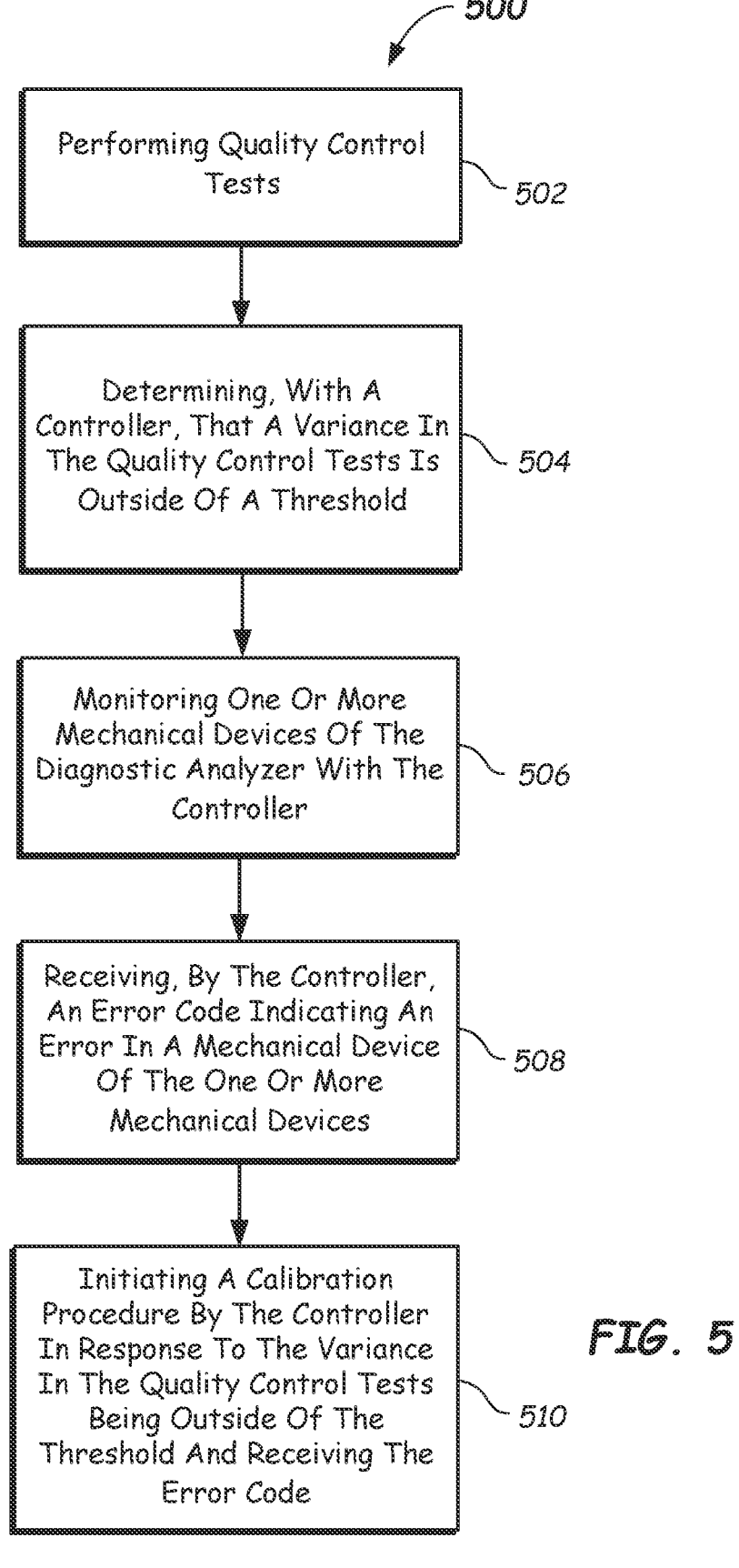
FIG. 5 illustrates a flowchart describing another method of operating a diagnostic analyzer according to one or more embodiments of the disclosure.

Reference is now made to FIG. 5, which is a flowchart illustrating a method 500 of operating a diagnostic analyzer (e.g., diagnostic analyzer 200). The method 500 includes, in block 502, performing quality control tests. The method includes, in block 504, determining, with a controller (e.g., controller 202), that a variance in the quality control tests is outside of a threshold. The method 500 includes, in block 506, monitoring one or more mechanical devices of the diagnostic analyzer with the controller. The method 500 includes, in block 508, receiving, by the controller, an error code indicating an error in a mechanical device of the one or more mechanical devices. The method 500 includes, in block 510, initiating a calibration procedure by the controller in response to the variance in the quality control tests being outside of the threshold and receiving the error code.

While specific apparatus and methods have been shown by way of example embodiments herein, it should be understood that other and different embodiments are possible. This disclosure is intended to cover all modifications, equivalents, and alternatives falling within the scope of the following claims.

What is claimed is:

1. A quality control method for a diagnostic analyzer, comprising:

performing a quality control test;

determining, with a controller, that a quality control test result is outside of a threshold;

monitoring one or more mechanical devices of the diagnostic analyzer with the controller;

receiving, by the controller, an error code indicating an error in a mechanical device of the one or more mechanical devices in response to the monitoring; and initiating a calibration procedure in response to both the quality control test result outside of the threshold and the receiving the error code, wherein the quality control test result alone is insufficient to initiate the calibration procedure.

2. The method of claim 1, wherein determining, with a controller, that a result of the quality control test is outside a threshold comprises determining, with a controller, that a variance in quality control tests is outside a threshold.

3. The method of claim 1, wherein the diagnostic analyzer includes one or more encoders, wherein the one or more encoders are configured to monitor position of the one or more mechanical devices, and wherein the error code indicates an error with the position of the one or more mechanical devices.

4. The method of claim 1, wherein the diagnostic analyzer includes one or more hall-effect sensors, wherein the one or more hall-effect sensors are configured to monitor position of the one or more mechanical devices, and wherein the error code indicates an error with the position of the one or more mechanical devices.

5. The method of claim 1, wherein the one or more mechanical devices includes one or more motors and wherein the error code indicates an error with the one or more motors.

6. The method of claim 5, wherein the error with the one or more motors indicates a high current condition associated with the one or more motors.

7. The method of claim 5, wherein the error with the one or more motors indicates an undervoltage condition with the one or more motors.

8. The method of claim 1, wherein the one or more mechanical devices includes one or more movable devices and wherein the error code indicates a crash of the one or more movable devices.

9. The method of claim 8, wherein the one or more movable devices is a pipette.

10. The method of claim 1, wherein the one or more mechanical devices includes an aspiration device and wherein the error code indicates a pressure associated with the aspiration device being outside a threshold.

11. The method of claim 1, wherein initiating a calibration procedure comprises prompting a user to initiate a calibration procedure.

12. The method of claim 1, wherein initiating a calibration procedure comprises providing instructions to a user to perform a calibration procedure.

13. The method of claim 1, wherein initiating a calibration procedure comprises causing the diagnostic analyzer to perform an automated calibration procedure.

14. The method of claim 1, wherein the diagnostic analyzer includes an encoder and wherein the calibration procedure comprises aligning the encoder.

15. The method of claim 1, wherein the diagnostic analyzer comprises a motor and wherein the calibration procedure comprises at least one of measuring current to the motor or measuring voltage at the motor.

16. The method of claim 1, wherein the diagnostic analyzer includes one or more hall-effect sensors and wherein the calibration procedure comprises aligning the one or more hall-effect sensors.

17. The method of claim 1, wherein the diagnostic analyzer includes one or more movable devices and wherein the calibration procedure comprises aligning the one or more moving devices.

18. The method of claim 17, wherein the one or more movable devices is a pipette and wherein the calibration procedure comprises aligning the pipette.

19. The method of claim 1, wherein the diagnostic analyzer includes an aspiration device and wherein the calibration procedure comprises measuring a pressure associated with the aspiration device.

20. The method of claim 1, further comprising:

performing a plurality of specimen tests to obtain a plurality of specimen test results;

determining that a moving average of the plurality of specimen test results is outside of a threshold; and initiating a second calibration procedure in response to the plurality of specimen test results being outside of the threshold and the receiving the error code.

21. A diagnostic analyzer, comprising:

a controller configured to:

perform a quality control test;

determine that a quality control test result is outside of a threshold;

monitor one or more mechanical devices of the diagnostic analyzer;

receive an error code indicating an error in a mechanical device of the one or more mechanical devices in response to the one or more mechanical devices being monitored; and initiate a calibration procedure in response to both the quality control test result outside of the threshold and receiving the error code, wherein the quality control test result alone is insufficient to initiate the calibration procedure.

22. A method of operating a diagnostic analyzer, comprising:

performing quality control tests with the diagnostic analyzer, wherein a quality control test analyzes a quality control sample and has an expected result;

determining, with a controller, that a variance in the quality control tests is outside of a threshold;

monitoring one or more mechanical devices of the diagnostic analyzer with the controller;

receiving, by the controller, an error code indicating an error in a mechanical device of the one or more mechanical devices in response to monitoring of the one or more mechanical devices; and initiating a calibration procedure by the controller in response to the variance in the quality control tests being outside of the threshold and receiving the error code, wherein the variance in the quality control tests alone is insufficient to initiate the calibration procedure.

* * * * *